Nov. 23, 1943.   R. S. TAYLOR   2,334,734
TORQUE CONTROLLED MECHANISM
Original Filed Dec. 3, 1937   3 Sheets-Sheet 1
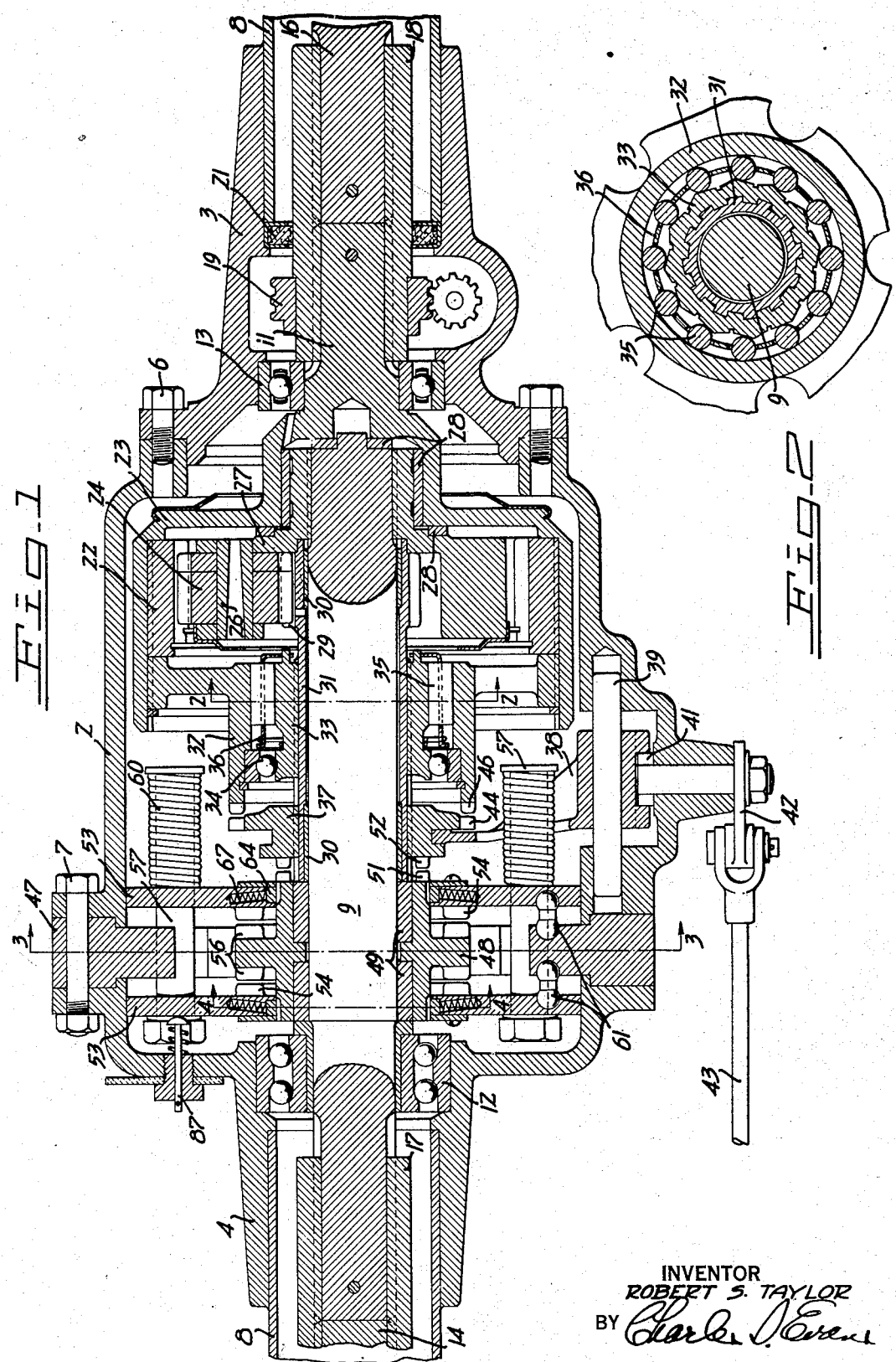
INVENTOR
ROBERT S. TAYLOR
BY
HIS ATTORNEY Nov. 23, 1943.    R. S. TAYLOR    2,334,734
TORQUE CONTROLLED MECHANISM
Original Filed Dec. 3, 1937    3 Sheets-Sheet 2
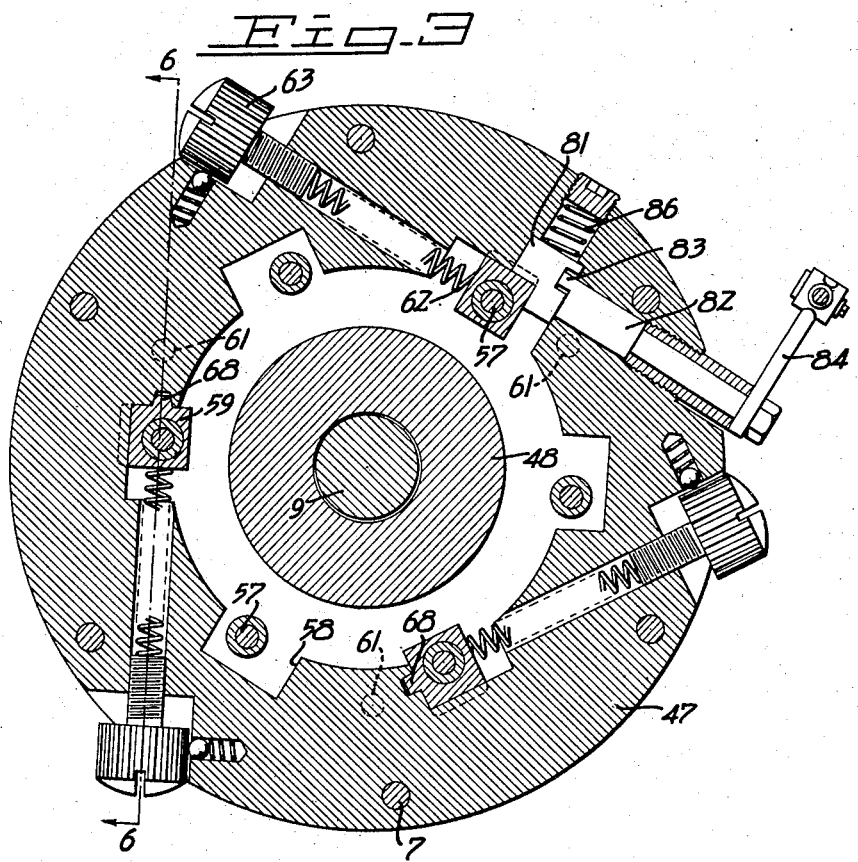
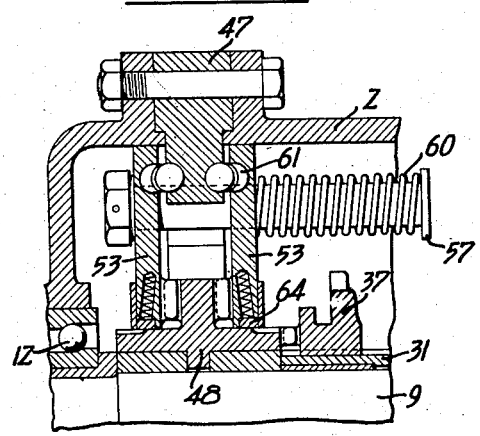
INVENTOR
ROBERT S. TAYLOR
BY Charles
HIS ATTORNEY

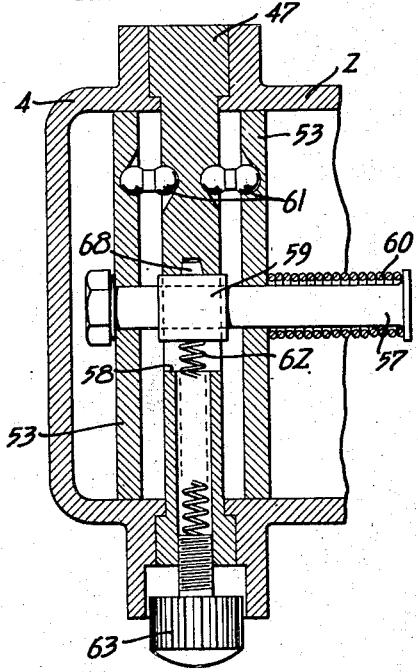
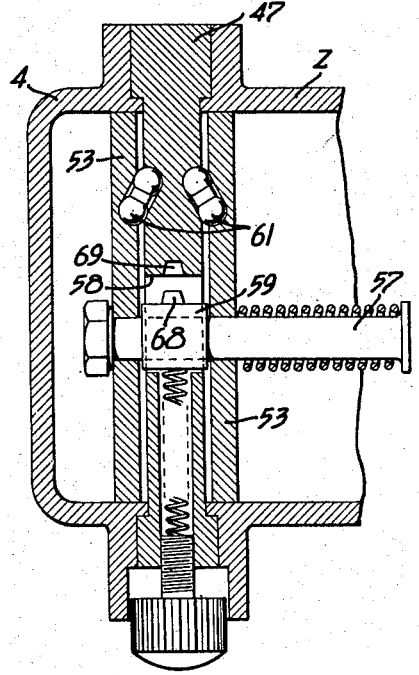
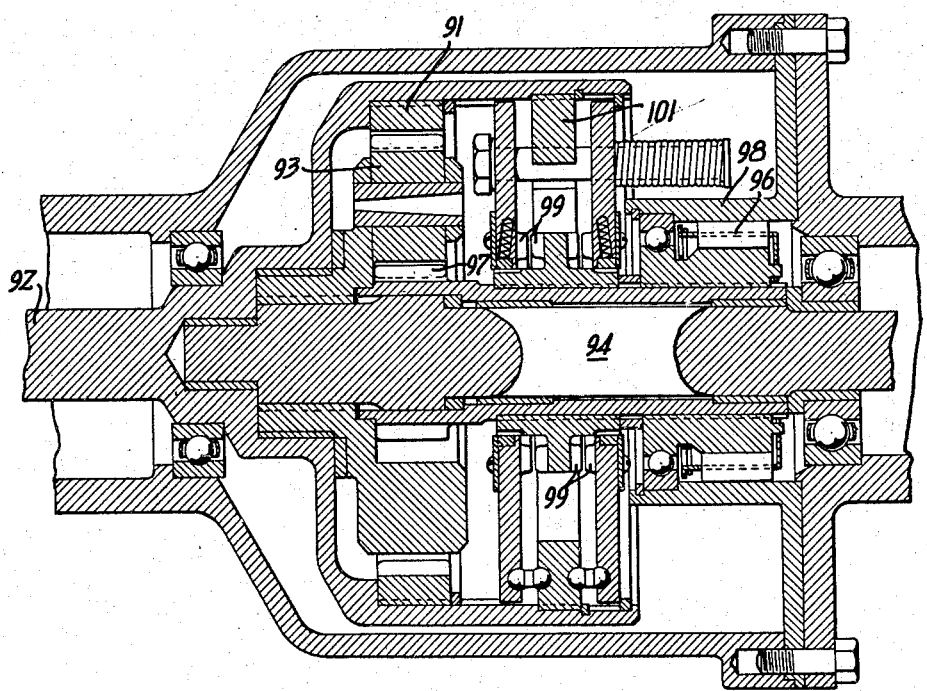

Patented Nov. 23, 1943

2,334,734

UNITED STATES PATENT OFFICE 2,334,734

TORQUE CONTROLLED MECHANISM

Robert S. Taylor, Seattle, Wash.

Original application December 3, 1937, Serial No. 177,902, now Patent No. 2,244,133, dated June 3, 1941. Divided and this application September 17, 1940, Serial No. 357,141

15 Claims. (Cl. 188—134)

This application is a division of my copending application, Serial No. 177,902, filed December 3, 1937, and issued on June 3, 1941, as Patent No. 2,244,133.

My invention relates to mechanism actuated in response to torque; and more particularly to such mechanism operating in conjunction with a speed change system.

It is among the objects of my invention to provide torque controlled means for changing the speed ratio in a transmission gearing.

Another object is to provide improved mechanism for effecting the speed change when torque reaches a predetermined value.

Further objects include the provision of torque means for actuating positively engageable elements, such as toothed brake or clutch elements; and the provision of such means for synchronizing the engagement of the elements.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is an axial sectional view showing a transmission embodying the improvements of my invention.

Figure 2 is a transverse vertical sectional view of the transmission, taken in a plane indicated by the line 2—2 of Figure 1, and showing the one-way clutch between the parts of the planetary gear system.

Figure 3 is a transverse vertical sectional view, taken in a plane indicated by the line 3—3 of Figure 1, and showing the torque controlled brake mechanism.

Figure 4 is another transverse vertical sectional view, taken in a plane indicated by the line 4—4 of Figure 1, and showing the ratchets between the brake elements.

Figure 5 is a fragmentary axial sectional view of the transmission, showing the torque controlled brake in its engaged position.

Figures 6 and 7 are fragmentary sectional views, taken in a plane indicated by line 6—6 of Figure 3, and showing the torque controlled brake toggles in extended and collapsed positions, respectively.

Figure 8 is an axial sectional view of an underdrive transmission embodying my invention.

In terms of broad inclusion, the mechanism of my invention comprises a pair of engageable elements, and torque means for controlling relative movement between the elements. Means are also provided for synchronizing engagement of the elements. As embodied in an overdrive transmission having a planetary gear system my mechanism comprises a brake for holding a part of the system against rotation; and as embodied in an underdrive transmission the mechanism comprises a clutch for locking the system together for rotation as a unit.

In greater detail, and referring to Figures 1 to 7 of the drawings, an overdrive transmission embodying the torque controlled mechanism of my invention is contained in a housing adapted to be interposed in the torque tube of an automobile, and preferably comprising an intermediate section 2 fastened to end sections 3 and 4 by suitable studs and bolts 6 and 7. The end sections are formed with necks adapted to be connected with the end portions 8 of the torque tube. While the transmission is shown interposed in a torque tube behind the ordinary speed change transmission, it is understood that the unit may be incorporated in the drive train ahead of the ordinary transmission.

A drive shaft 9 and driven shaft 11 are provided in the housing, journaled in suitable bearings 12 and 13. These shafts are axially aligned and are connected to driving and driven sections 14 and 16 of the propeller shaft by suitable sleeves 17 and 18. Driven sleeve 18 also preferably carries the speedometer gear 19, and an oil retaining ring 21 is preferably interposed between the sleeve and housing.

A planetary gear system is arranged in the housing and comprises an orbit or ring gear 22 splined in a cup-shaped rotor 23 formed on the end of driven shaft 11. The planet pinion 24 of the planetary system is journaled on a shaft 26 carried by a spider 27 splined on the inner end of drive shaft 9. A plurality, say three, of these planet pinions are provided. The hub of spider 27 is preferably journaled in the recessed end of rotor 23, and suitable bearing rings 28 are provided between these parts.

The sun gear 29 of the planetary system is mounted on the inner end of a sleeve 31 journaled on drive shaft 9 on suitable bearings 30. By this arrangement of the planetary gears a speed increase or overdrive is provided when the sun gear is held against rotation, as will be readily understood. If the sun gear is not held the planetary system is of course ineffective, since the sun gear will merely spin freely.

A one-way clutch is interposed between parts of the planetary gear system, preferably between the orbit and sun gears. For this purpose a pair of overrunning clutch rings 32 and 33 are provided, separated by a bearing 34; the outer ring 32 being splined in orbit gear rotor 23 and the inner ring being splined on sun gear sleeve 31. A series of clutch rollers 35 are arranged between the rings, and are urged counterclockwise as viewed in Figure 2 by a spring turned cage 36. In this normal position of the rollers the latter are wedged between the clutch rings by the inclined faces on the inner ring.

This locks the sun gear to the orbit gear when the sun gear tends to rotate clockwise, but leaves the sun gear free to spin counterclockwise if it is not otherwise held. Therefore, in the position of the parts shown in Figure 1, clockwise rotation of the drive shaft results in the planet gears tending to rotate the sun gear clockwise relative to the orbit gear; all references to clockwise and counterclockwise rotation being taken as viewed from the left in Figure 1. But relative clockwise rotation of the sun gear is prevented by the one-way clutch rollers 35, so that the planetary system is locked for unitary rotation. As a result, the drive and driven shafts are connected together for direct drive.

This condition is maintained as long as the drive shaft tends to overrun the driven shaft. When the driven shaft tends to overrun the drive shaft however, the planet pinions turn the sun gear counterclockwise, which it is free to do. Thus the driven shaft is free to overrun the drive shaft, giving the ordinary free-wheeling principle.

Means are also provided for optionally locking the sun gear to the orbit gear so that they are positively fixed for unitary rotation. For this purpose a clutch member 37 is slidably splined on sun gear sleeve 31, and is shiftable by a yoke 38 slidably mounted on pin 39. The yoke is moved by an eccentric cam 41 turned by a crank 42 connected to a suitable lever in the driver's compartment by a connecting rod 43. In the position of the clutch member shown in Figure 1 the sun gear is free to rotate, except as limited by the one-way clutch rollers 35. When the clutch member is shifted back however, the clutch teeth 44 are engaged with teeth 46 on ring 32, thus positively locking the sun and orbit gears together in either direction of rotation of the sun gear. This locks out the one-way clutch in event free-wheeling is not desired.

Also, positive clutching of the parts together permits the car to be placed in reverse, and when my transmission is located behind the ordinary transmission a suitable connection is made between the regular shifting mechanism and connecting rod 43 so that clutch member 37 is always shifted back when the car is put in reverse. In other words, member 37 is optionally shiftable at the will of the driver, but is always moved back by the act of putting the car in reverse. Of course if my transmission is located ahead of the ordinary speed change transmission the shifting back of clutch member 37 when the car is put in reverse is not necessary, because then the rotation of the drive shaft is always clockwise.

The mechanism to which my invention particularly relates is a torque controlled brake for holding the sun gear against rotation to operatively connect the shafts together through the overdrive gearing. The brake mechanism is supported by an annular ring or fixed reactor element 47 bolted between sections 2 and 4 of the housing; the brake operating to releasably lock the sun gear to this fixed element. The brake comprises a central element or ring 48 freely journaled on the drive shaft on suitable bearings 49. This brake element is connected for rotation with the sun gear whenever the manually shiftable member 37 is moved ahead to engage teeth 51 and 52.

A pair of brake elements or plates 53 are mounted adjacent each side of the central brake element 48 and are adapted to engage the latter through an annular series of teeth 54 on the plates capable of meshing a complementary series of teeth 56 on opposite sides of the central brake ring. Plates 53 are adapted to move toward and away from each other to engage and disengage the central brake ring, and are also capable of a limited degree of turning movement. The plates are connected by a plurality of pins or bolts 57 extending through notches 58 in the fixed element. These notches limit turning movement of the plates, and blocks 59 are provided on several of the pins for slidably engaging the notches. See Figure 3.

The inner ends of pins 57 project beyond the inside plate and each has a spring 60 compressed between the end of the pin and plate. These springs serve to press the plates together, tending to engage the latter with the central brake ring 48. A series of pivoted arms 61 are interposed between the fixed element 47 and plates 53. These arms are preferably in the nature of round nosed pieces arranged in pairs on opposite sides of the fixed element and seated in sockets provided in the fixed element and plates. By this arrangement the pairs of pivoted arms 61 function as toggles; the arms of which are movable between extended and retracted positions upon relative turning movement between plates 53 and fixed element 47.

When the brake plates 53 are rotated clockwise to the limit of rotation in this direction permitted by pins 57 in notches 58, the toggle arms 61 are moved to extended positions to spread plates 53 out of engagement with the central brake element 48. This opening of the toggles to extended positions is of course resisted by springs 60. Figures 1 and 6 show the relationship between the parts when the toggles are extended.

When the brake plates are rotated counterclockwise to the limit of rotation in the opposite direction permitted by pins 57 in notches 58, the toggle arms 61 are retracted or collapsed to bring plates 53 together and into engagement with the central brake element 48. Figures 5 and 7 show the parts with the toggles collapsed. It will be noted that plates 53 close with a combined inward and turning motion, due to the action of pivoted arms 61. This particular movement insures a positive and smooth engagement of the clutch teeth 54 and 56.

By this arrangement it is seen that plates 53 will spread to disengage the brake when the clockwise torque of the central brake element 48 is sufficient to overcome the resistance which springs 60 offer to the opening of the toggles. It is to be noted that the toothed brake elements operate to positively hold the sun gear until the precise time when the torque becomes great enough to open the toggles. Prior to opening there is no slippage, and once the critical torque is reached the brake disengages quickly. It is also to be noted that the relatively small angle which arms 61 make with elements 47 and 57 in the retracted position offers a large initial resistance to opening movement, but this resistance decreases as the arms extend, since the effective lever arms increase as arms 61 move out. To insure complete opening of the toggles after the opening movement has once started, a plurality of springs 62 are preferably provided to bear against blocks 59. These springs urge the plates clockwise and function to snap the toggles into final open positions. Adjusting screws 63 are provided for altering the compression of these springs; which screws are held in a selected position of adjustment by spring-pressed balls engaging grooves in the screw heads as shown in Figure 3.

Rotation of brake plates 53 counterclockwise, for the purpose of collapsing the toggles to engage the brake, is also derived from rotation of the central brake element 48. As shown in Figures 1 and 4, a series of one-way engaging devices or ratchets 64 are mounted on the inner peripheries of the brake plates for engaging ratchet teeth 66 formed in the central element 48. The ratchets are pressed by light springs 67; and the ratchet teeth are formed to permit free rotation of brake element 48 clockwise, but to turn plates 53 with element 48 when the latter tends to rotate counterclockwise. It will be noted that brake elements 53 are turning with central brake element 48 at the time of engagement. This turning of the brake elements in the same direction, together with the combined inward and turning motion of brake elements 53 due to the toggle action, insures perfect synchronization of the engaging parts.

Two of the blocks 59 are preferably provided with plug-like projections 68 for seating in sockets 69 provided in fixed element 47, so that the plugs enter the sockets and serve as cushioning means to quiet the stop when the transmission changes from overdrive to direct.

The operation of the torque controlled brake is as follows: Consider that the optionally shiftable clutch member 37 is at the left to lock central element 48 with the sun gear, and also consider that plates 53 of the releasable brake are open. Under these conditions, the parts of the planetary system are locked together for direct drive by the one-way clutch rollers 35 so long as the drive shaft tends to overrun the driven shaft (which condition obtains under driving load). At this time the central brake element 48 merely turns clockwise, which it is free to do since ratchets 64 do not prevent it.

However, when the driven shaft tends to overrun the drive shaft (which condition obtains under coasting load), the sun gear tends to run counterclockwise. This turns the brake plates 53 counterclockwise through ratchets 64, thus collapsing toggles 61 to engage the brake plates and lock the sun gear to the fixed element. With the sun gear locked against rotation the pinions 24 planetate about it, causing the orbit gear to rotate faster than the drive shaft. One-way clutch rollers 35 do not interfere with such relative rotation since its outer ring 32 is free to overrun the inner ring 33. The shafts are thus connected together through the planetary overdrive.

This overdrive connection will be maintained as long as the brake plates 53 remain engaged. The torque of the sun gear of course is transmitted from central clutch element 48 to the brake plates 53, tending to turn them clockwise and open the toggles. But considerable torque is necessary to do this, because the angle between the toggles is relatively small and great force is required to open them against spring 60. It will be observed that the force required to open the toggles is greatest at the start and decreases rapidly as the toggles spread apart. This insures that any force sufficient to start the toggles opening is ample to complete the brake release motion.

The releasable brake is designed to keep the car in overdrive until the torque of the sun gear exceeds a predetermined value. This brake releasing torque is calculated to cut out the overdrive before the load on the motor becomes too great. When the torque controlled brake releases the sun gear the shafts are immediately connected for direct drive by the one-way clutch rollers 35, because at this time the drive shaft is tending to overrun the driven shaft. The direct drive will then be maintained until such time as the driven shaft again tends to overrun the drive shaft, providing of course that the manually controlled clutch member 37 remains in its forward position of engagement with the torque controlled brake unit. As long as the torque controlled brake is in operation the driver may put the car in overdrive at any time by releasing the throttle and then pressing in and letting out the regular foot clutch pedal. The effort of the car wheels to speed up the motor will then force the sun gear counterclockwise to collapse the toggles and engage brake plates 53.

Means are provided for locking the shafts together through the overdrive. As shown in Figure 3, a slidable block 81 is arranged in the fixed element 47, and is adapted to be interposed between one of the blocks 59 and the end of its notch. Block 81 is normally up out of the way (as seen in Figure 3), but may be brought down when blocks 59 are back in the collapsed position of the toggles. Movement of block 81 is controlled by a shaft 82 journaled in the fixed element and having an eccentrically disposed pin 83 engaging the block so that the latter is moved in and out when the shaft is rotated by a crank 84 connected to a suitable knob or lever in the driver's compartment. A spring 86 behind the block assists the latter's inward movement when crank 84 is rotated.

The transmission of my invention therefore provides means for cutting the overdrive gearing into and out of the drive train; depending upon the rotational relationship and torque conditions between the shafts. The mechanism also permits the operator to optionally lock the shafts for direct drive; or connect them for direct drive with free-wheeling; or connect them through the torque controlled overdrive; or lock them together through the overdrive.

Indicating means may be provided if desired for showing when the transmission is in either direct or overdrive. Such indicating means may comprise any suitable signaling circuit for energizing a lamp on the dash board, preferably controlled by a spring pressed pin 87 on housing 2 and engageable with one of the brake plates 53.

If desired, the bolts 57 which connect the brake plates 53 may be centrally positioned so that the bolts project out an equal distance from each of the plates, and springs arranged on both ends of the bolts. This would reduce the length of springs 60 and also provide a more balanced unit.

While I have shown my torque mechanism as a brake in an overdrive gearing, it is understood that the mechanism may operate as a clutch such as provided in an underdrive gearing. In the latter case, as shown in Figure 8, the orbit gear 91 is connected to the drive shaft 92 and the planet pinion 93 to the driven shaft 94. In this relationship the one-way brake 96 is arranged to lock the sun gear 97 to the fixed element 98, and a torque controlled clutch 99 is interposed between the sun and orbit gears to lock the system together for rotation as a unit. In this case the toggle supporting or reactor element 101, instead of being a fixed element, is mounted for rotation with the orbit gear. With this combination, the load is first picked up and carried through the direct drive until the load releases the torque controlled clutch. Then the one-way brake locks the sun gear to give the underdrive. This underdrive relationship is then maintained until the driven shaft tends to overrun the drive shaft, at which time the torque controlled clutch is again engaged to lock the gearing in direct.

When operating either as a brake or as a clutch my torque mechanism has the advantage of positively holding the engaged parts together without slippage until a predetermined value of torque is reached, at which time the engaged elements are quickly released. The toggle arms offer decreasing resistance to opening once opening movement has started, thus insuring that torque sufficient to start the disengaging operation will be enough to rapidly complete it. In both cases the mechanism also insures synchronized meshing of the toothed brake and clutch elements.

I claim:

1. In combination, toothed engageable elements relatively movable between engaged and disengaged positions, and torque means operating on a lever arm of changing length for controlling said movement, said lever arm being shortest when the elements are engaged.

2. In combination, engageable elements, and a pivoted arm retractable to engage the elements and extensible to disengage the latter, the arm being movable from a retracted position of less than 45° angularity to one of the elements to an extended position of increased angularity thereto.

3. In combination, toothed engageable elements, a fixed reactor element relative to which one of the engageable elements has a turning movement, and means responsive to said turning movement for engaging and disengaging the first mentioned elements.

4. In combination, engageable elements, a reactor element relative to which one of the engageable elements has a turning movement, and means including a pivoted arm subject to compression only interposed between one of the engageable elements and the reactor element and responsive to said turning movement for engaging and disengaging the engageable elements.

5. In combination, engageable elements, a reactor element relative to which one of the engageable elements has a turning movement, means responsive to said turning movement in either direction for respectively engaging and disengaging the first mentioned elements according to the direction of relative turning movement, and means interposed between the first mentioned elements serving when the latter have become disengaged because of relative turning in one direction to effect reengagement thereof upon a subsequent reversal of the direction of relative turning movement.

6. In combination, engageable elements, a reactor element relative to which one of the engageable elements has a turning movement, means responsive to said turning movement in either direction for respectively engaging and disengaging the first mentioned elements according to the direction of relative turning movement, and a one-way engaging device interposed between the first mentioned elements serving when the latter have become disengaged because of relative turning in one direction to effect reengagement thereof upon a subsequent reversal of the direction of relative turning movement.

7. In combination, engageable toothed elements, a reactor element relative to which one of the toothed elements has a limited turning movement, means interposed between the toothed elements to effect said turning movement, and a pivoted arm retractable upon said turning movement to engage the elements.

8. In combination, a toothed central element, a pair of toothed plates engageable with the central element, a reactor element relative to which said plates have a limited turning movement, and toggle arms pivotally connected between the reactor element and said plates for engaging and disengaging the latter with the central element upon said turning movement.

9. In combination, engageable elements, a reactor element relative to which one of the engageable elements has a limited turning movement, means including a pivoted arm interposed between the reactor and relatively turnable elements for engaging the first mentioned elements upon said movement, and means interposed between the reactor and relatively turnable elements for reducing the shock of said engagement.

10. A connector mechanism comprising a pair of toothed engageable elements, a reactor element relative to which one of said toothed elements has a limited turning movement, and means responsive to said turning movement and including a pivoted arm interposed between a toothed element and the reactor element for effecting engagement of said pair of elements without clashing the teeth.

11. A connector mechanism comprising a pair of toothed engageable elements, a reactor element relative to which one of said toothed elements has a limited turning movement, means responsive to said turning movement and including a pivoted arm interposed between a toothed element and the reactor element for effecting engagement of said pair of elements without clashing the teeth, and means for resiliently urging the toothed elements into engagement.

12. A connector mechanism comprising a pair of toothed engageable elements, a reactor element relative to which one of said toothed elements has a turning movement, means responsive to said turning movement in either direction and including a pivoted arm interposed between a toothed element and the reactor element for respectively effecting engagement and disengagement of said pair of elements according to the direction of relative turning movement without clashing the teeth, and means interposed between the toothed elements serving when the latter have become disengaged because of relative turning in one direction to effect reengagement thereof upon a subsequent reversal of the direction of relative turning movement.

13. A connector mechanism comprising a pair of toothed engageable elements, a reactor element relative to which one of said toothed elements is turnably and axially movable, and pivoted means interposed between the reactor element and said relatively movable element to effect engagement of the toothed elements by a combined turning and axial movement of said relatively movable element.

14. A connector mechanism comprising a pair of toothed engageable elements, torque responsive means for disengaging the elements when a first of said elements turns in one direction, and a one-way device interposed between the elements to effect reengagement thereof upon turning of said first element in the opposite direction.

15. A connector mechanism comprising a pair of engageable elements, means for mounting said elements to disengage under torque when a first of said elements turns in one direction, and means including a one-way device for effecting engagement of the elements when said first element turns in the opposite direction.

ROBERT S. TAYLOR.